Oct. 25, 1966 J. J. HANAK 3,281,738

SUPERCONDUCTING SOLENOID

Filed Feb. 28, 1964 2 Sheets-Sheet 1

INVENTOR.
JOSEPH J. HANAK
BY Morris L. Rabkin
Attorney

INVENTOR.
JOSEPH J. HANAK
BY Morris L. Rabkin
Attorney

United States Patent Office 3,281,738
Patented Oct. 25, 1966

3,281,738
SUPERCONDUCTING SOLENOID

Joseph J. Hanak, Trenton, N.J., assignor to Radio Corporation of America, a corporation of Delaware Filed Feb. 28, 1964, Ser. No. 348,141
14 Claims. (Cl. 335—216)

This invention relates generally to the art of super-conducting structures, and more particularly to an improved superconducting solenoid. The superconducting solenoid of the present invention is particularly useful in the field of plasma physics where very powerful magnetic fields are employed.

It has been proposed to provide superconducting solenoids of niobium compounds, such as niobium-tin, for example, by forming continuous coils of this material. It has also been proposed to use a cylinder of niobium-tin as a solenoid structure, but such a structure has a tendency to be unstable, that is, it is susceptible to the phenomenon of flux jumping. Flux jumping causes the solenoid structure to go out of the state of superconduction, and, consequently, the solenoid structure does not trap or retain as large a magnetic field as is otherwise possible.

It is an object of the present invention to provide an improved superconducting solenoid that overcomes the aforementioned disadvantages of prior art superconducting solenoids.

Another object of the present invention is to provide an improved superconducting solenoid that is capable of trapping and retaining greater magnetic fields than those of the prior art.

A further object of the present invention is to provide an improved superconducting solenoid that is relatively simple in construction, highly efficient in trapping large magnetic fields, and relatively free from flux jumping.

Briefly described, the improved superconducting solenoid of the present invention comprises a laminar stacking of two sets of disks. Each disk in one set of disks comprises a substrate coated on at least one side thereof with a plurality of separated concentric rings of a superconducting material, such as niobium-tin, for example. Each of the disks in the other set of disks comprises a material that has a relatively high thermal and electrical conductivity, such as copper, for example. The improved superconducting solenoid comprises a laminar stacking of the first and second sets of disks, the disks in the first set being separated from each other by a disk of the second set. The disks may be fixed in their laminated arrangement by a press-like structure.

The novel features of the present invention, as well as the invention itself, both as to its organization and method of operation, will be understood more fully when considered in connection with the accompanying drawings, in which similar reference characters represent similar parts throughout, and in which.

Figure 3:
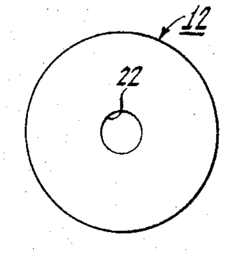
FIG. 3 is a plan view of a disk of relatively good heat conducting material of the type used in superconducting solenoids of the present invention.
Figure 8:
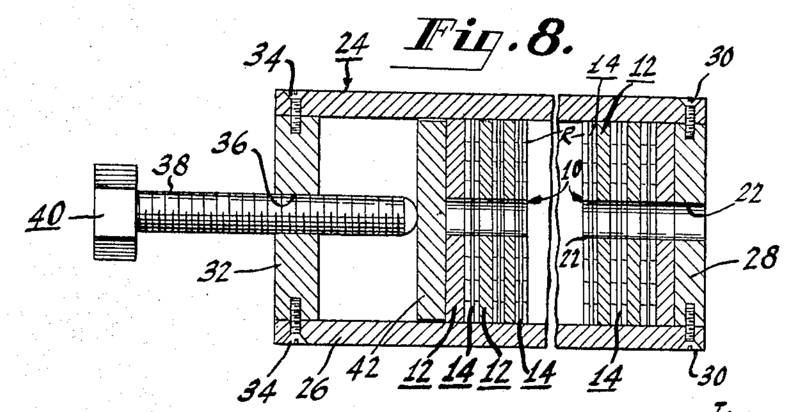
FIG. 8 is a longitudinal cross-section of a press maintaining the superconducting solenoids of the present invention in a laminar arrangement.

Referring, now, particularly to FIG. 8 of the drawing, there is shown a superconducting solenoid 10 comprising a stack of two sets of interleaved disks 12 and 14. One set of disks 12 comprises a material such as copper, gold, aluminum, or silver, for example, that has a relatively high thermal and electrical conductivity. Each disk 12 of the first set of disks, as shown in FIG. 3, should be as thin as practicable. The thickness of the disk 12 may be within the range of from $5\times10^{-4}$ cm. to $5\times10^{-2}$ cm. for practical purposes.

Figure 7:
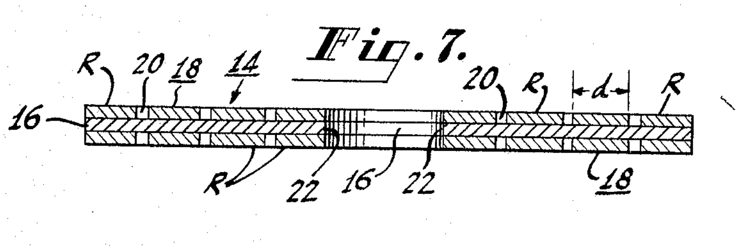
FIG. 7 is an enlarged, cross-sectional view taken along the line 7—7 in FIG. 4 and viewed in the direction indicated by the appended arrows.

Each of the disks 14 in the second set of disks comprises a substrate 16 (FIG. 7) of a material having a melting point in excess of 1200° C. (i.e. the deposition temperature of niobium-tin). The substrate 16 should also be as thin as practicable and may have a thickness within the range from $5\times10^{-4}$ cm. to $5\times10^{-2}$ cm.

At least one side, and preferably both sides, of the substrate 16 should be coated with a superconducting material 18 such as niobium-tin, niobium-gallium, or vanadium-silicon, for example. When the superconducting material 18 is niobium-tin, it may be deposited on the substrate 16 of platinum by heating the substrate 16 in the presence of heated vapors of niobium-chloride, tin-chloride and hydrogen to a temperature sufficient to induce the reaction of at least a portion of the chlorides, whereby to deposit the metal portions (niobium-tin) of the reduced chlorides on the substrate. The process of coating a platinum substrate 16 with niobium-tin is described in an article, "Vapor Deposition of $Nb_3Sn$," in Metallurgy of Advanced Electronics, (A.I.M.E.), volume 19, pages 161 to 171, edited by G. E. Brock, Interscience Publishers, New York, New York, 1963.

Figure 4:
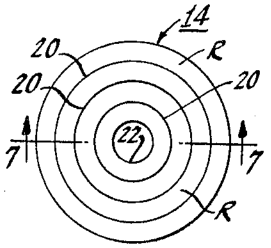
FIGS. 4, 5 and 6 are plan views of disks coated with superconducting material in the form of separated concentric rings used in the superconducting solenoids of the present invention.
Figure 5:
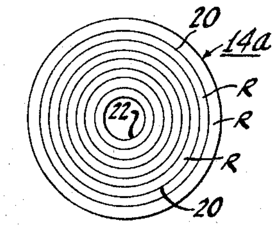
Figure 6:
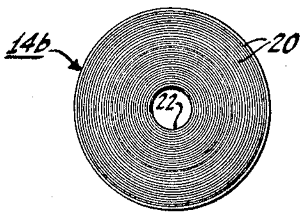

The superconducting material 18 is divided into separated concentric rings R of equal thickness by forming a plurality of concentric grooves 20 in the superconducting material 18 by any suitable means, such as by sand blasting, etching with hot alkali, or scratching away the superconducting material. Thus, looking at FIGS. 4 and 7, there is shown a disk 14 formed with four separated, concentric rings R of superconducting material 18 on both sides of the substrate 16. A superconducting disk 14*a*, having 8 rings R, is shown in FIG. 5. The superconducting disk 14*a* is substantially similar to the superconducting disk 14 except for the fact that the former is formed with eight separated, concentric rings R of superconducting material 18 instead of four rings R. A superconducting disk 14*b* having a plurality of separated, concentric rings R of superconducting material 18 in excess of eight is shown in FIG. 6. Each of the disks 12, 14 may be formed with a concentric opening 22, the openings 22 being aligned with each other when the disks are assembled.

The coated, superconducting material 18 should have a thickness within a range of from $10^{-5}$ cm. to $10^{-2}$ cm. The radial distance *d* between the inner and outer peripheries of each of the concentric rings R of superconducting material 18 should be within a range between 0.02 cm. and 0.16 cm., preferably about 0.10 cm. It has been found that when the distance *d* is greater than 0.16 cm. or smaller than 0.02 cm., the intensity of the magnetic field that may be trapped (in a manner to be explained hereinafter) is not as great as when the distance *d* lies between 0.02 cm. and 0.16 cm., being optimum at about 0.10 cm. When the distance *d* of the rings R is too large, eddy currents tend to form and diminish the magnitude of the magnetic field that may be trapped. When the distance *d* of the rings R is too small, any imperfections in the rings R tend to reduce their current-carrying capacity and, hence, tend to reduce their flux-producing ability.

Referring again to FIG. 8 of the drawing, there is shown the superconducting solenoid 10 of interleaved disks 12 and 14 in a laminar structure within a press 24 of non-magnetic material. The press 24 comprises a tubular member 26 of a non-magnetic material such as brass or plastic, for example. One end of the tubular member 26 is closed with a disk 28 and held in position by any suitable means, as by screws 30. The disk 28 is formed with a concentric opening 22 that is in alignment with the openings 22 in the disks 12 and 14. The other end of the tubular member 26 is also closed with a disk 32 that is held in position by any suitable means, such as screws 34. The disk 32 is formed with a concentric, threaded opening 36 for receiving the threaded shank 38 of a screw 40. A solid disk 42 is slidably mounted within the tubular member 26. The stack of interleaved disks 12 and 14 is disposed between the disks 28 and 42, and pressure is exerted on the stack by means of the movable disk 42 and the screw 40 to maintain the stack in a fixed laminar arrangement.

To convert the superconducting solenoid 10 into a permanent magnet, the press 24, containing the interleaved disks 12 and 14, is placed in an established, external magnetic field and cooled to a temperature below the critical temperature of the superconducting material 18 so that the latter becomes superconducting. The cooling may be accomplished by immersing the press 24, containing the solenoid 10, in liquid helium (not shown). When the external magnetic field is reduced to zero, or removed, the solenoid 10 traps a portion of the internal magnetic field.

Figure 1:
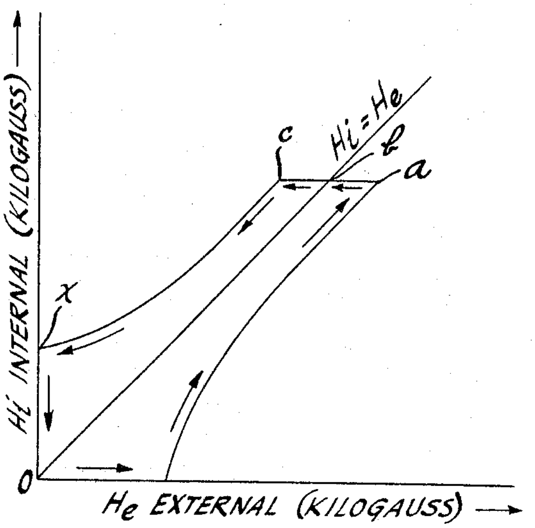
FIG. 1 is a graph illustrating the ideal behavior of a superconducting solenoid in an external magnetic field.

Referring, now, to FIG. 1, the graph of the ideal relationship between the external field $H_e$ applied to the solenoid 10 and the internal field $H_i$ shielded by the solenoid 10 is shown. It is seen that, as the external magnetic field $H_e$ increases, the trapped internal magnetic field $H_i$ lags to a point *a*. If the external magnetic field $H_e$ is now decreased, a point *b* is reached at which the internal magnetic field $H_i$ equals the external magnetic field $H_e$. If the external field $H_e$ is decreased still farther to a point *c*, the internal magnetic field $H_i$ becomes greater than the external magnetic field $H_e$. If the external magnetic field $H_e$ is now reduced to zero, the internal magnetic field $H_i$, having a value indicated by the point X, is trapped within the superconducing solenoid 10. The trapped magnetic field X will be maintained by the superconducting solenoid 10 as long as it is cooled below the critical temperature of the superconducting material 18.

Figure 2:
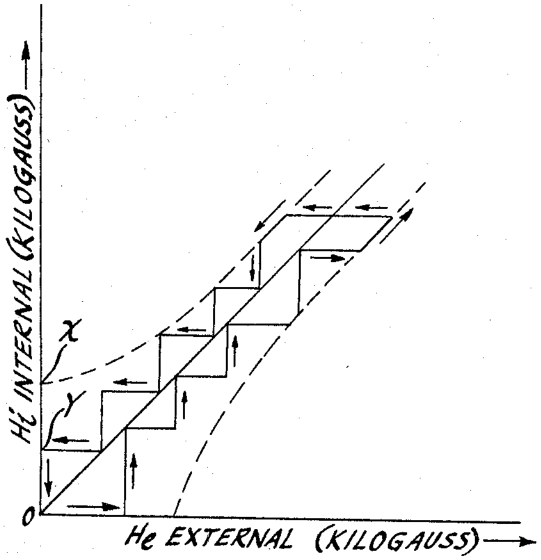
FIG. 2 is a graph illustrating the phenomenon of flux jumping of a superconducting solenoid in an external magnetic field.

Referring, now, to FIG. 2, the ideal relationship between the external and internal magnetic fields of a superconducting solenoid is shown in dashed lines, and the behavior known as flux jumping is shown in solid lines. Flux jumping takes place within a superconducting solenoid when excessive heat is produced or when the external field is increased or decreased too rapidly. The vertical lines in FIG. 2 indicate flux jumping caused by the superconducting solenoid becoming normal, that is, going out of superconduction. Under these circumstances, the maximum trapped magnetic field $H_i$ has a value indicated by the point Y, a value relatively much lower than the value indicated by the point X on the ideal curve.

A permanent magnetic field of great strength may be produced in a superconducting solenoid of the type described if the subtrate 16 of the disk 14 and the heat conducting disk 12 are as thin as practicable. The more disks 12 and 14 in the solenoid 10, and the more concentric rings R of the superconducting material 18 on each substrate 16, the greater is the magnetic field that may be trapped, provided that the distance *d* of each concentric superconducting ring R is between 0.02 cm. and 0.16 cm., preferably about 0.10 cm. A superconducting solenoid 10 comprising 491 eight-ring disks, 165 twenty-ring disks, and 656 copper disks, and having a length of 2.1 cm., a height of 2.54 cm., and a concentric hole 0.50 cm. in diameter, was able to trap a magnetic field of 60,000 gauss.

From the foregoing description, it can be seen that there has been provided an improved superconducting solenoid adapted to trap a higher magnetic field than heretofore possible by prior art structures of its size. While only a few embodiments of superconducting disks adapted for use in the improved superconducting solenoid of the present invention have been described, other components useful therein, as well as variations in the solenoid structure itself, all coming within the spirit of this invention, will, no doubt, readily suggest themselves to those skilled in the art. Hence, it is desired that the foregoing shall be considered as ilustrative and not in a limiting sense.

What is claimed is:

1. A magnet structure comprising a substrate having on at least one side thereof a plurality of separated, closed rings of a superconducting material, said rings being electrically insulated from each other with no direct-current connection between them while they are in the superconducting state, there being no external electrical energizing connections to said rings.

2. A magnet structure comprising a substrate, said substrate having on at least one side thereof a plurality of separated, closed concentric rings of a superconducting material, said rings being electrically insulated from each other with no direct-current connection between them while they are in the superconducting state, there being no external electrical energizing connections to said rings.

3. A superconducting magnet structure comprising
(a) a plurality of first disks, each having on at least one side thereof a plurality of separated, concentric rings of a material that is superconducting when cooled below its critical temperature,
(b) a plurality of second disks of relatively good heat conducting material, said second disks being interleaved with said first disks, and
(c) means holding said interleaved first and second disks in a laminar, stacked relationship.

4. A superconducting structure comprising
(a) a plurality of first disks, each comprising a substrate having a melting point in excess of 1200° C., each of said first disks having on at least one side of its said substrate a plurality of separated, concentric rings of a superconducting material,
(b) a plurality of second disks of a relatively good heat conducting material, said second disks being interleaved with said first disks, and
(c) means holding said interleaved first and second disks in a laminar stacked relationship, the distance between the inner and outer peripheries of each of said rings being in the range between 0.02 cm. and 0.16 cm.

5. A superconducting structure comprising
(a) a plurality of first disks, each comprising a substrate having a melting point in excess of 1200° C., each of said first disks having on at least one side of its said substrate a plurality of separated, concentric rings of a superconducting material, said superconducting material selected from the group consisting of niobium-tin, niobium-gallium, and vanadium-silicon,
(b) a plurality of second disks of a relatively good heat conducting material, each of said second disks being a metal selected from the group consisting of copper, gold, aluminum, and silver, said second disks being interleaved with said first disks, and
(c) means holding said interleaved disks in a laminar stacked relationship, said first and said second disks having a thickness within the range between $5\times10^{-4}$ cm. and $5\times10^{-2}$ cm., and said superconducting material having a thickness within the range between $10^{-5}$ cm. and $10^{-2}$ cm.

6. A superconducting solenoid comprising
(a) a plurality of first disks, each comprising on at least one side thereof a superconducting material, said superconducting material comprising a plurality of separated, concentric rings,
(b) a plurality of second disks of substantially the same dimensions as said plurality of first disks, said plurality of second disks comprising a metal selected from the group consisting of copper, gold, aluminum, and silver, and
(c) pressure means for holding said first and said second disks in an interleaved, laminar arrangement.

7. A super conducting solenoid comprising
(a) a plurality of first disks, each comprising a substrate having a thickness within the range between $5\times10^{-4}$ cm. and $5\times10^{-2}$ cm., each of said first disks being coated on at least one side of its said substrate with a superconducting material, said superconducting material having a thickness within the range between $10^{-5}$ cm. and $10^{-2}$ cm., said superconducting material comprising a plurality of separated, concentric rings, the distance between the inner and outer peripheries of each of said rings being within the range between 0.02 cm. and 0.16 cm.,
(b) a plurality of second disks of substantially the same dimensions as said plurality of first disks, said second plurality of disks comprising a material selected from the group consisting of copper, gold, aluminum and silver,
(c) means for holding said first and said second disks in an interleaved, laminar arrangement, and
(d) each of said first and second disks being formed with a concentric hole therein.

8. A superconducting magnet structure comprising
(a) a plurality of first disks, each comprising on at least one side thereof a ring of material that is superconducting when cooled below its critical temperature,
(b) a plurality of second disks of a relatively good heat conducting material, said second disks being interleaved with said first disks, and
(c) means holding said interleaved first and second disks in a laminar, stacked relationship.

9. A superconducting structure comprising
(a) a plurality of first disks, each comprising on at least one side thereof a ring of superconducting material,
(b) a plurality of second disks of a relatively good heat conducting material, said second disks being interleaved with said first disks, and
(c) means holding said interleaved first and second disks in a laminar stacked relationship, the distance between the inner and outer peripheries of each of said rings being within the range between 0.02 cm. and 0.16 cm., said superconducting material being niobium-tin, and said second disks having a thickness within the range between $5\times10^{-4}$ cm. and $5\times10^{-2}$ cm.

10. A magnet structure comprising
(a) at least one closed single turn of superconducting material positioned in one plane, (b) at least one closed single turn of superconducting material positioned in a plane adjacent and parallel to said one plane, and
(c) the closed turn in said one plane being separated from the closed turn in said adjacent plane by material that has good heat conductivity.

11. A magnet structure comprising
(a) at least one closed single turn of superconducting material positioned in one plane,
(b) at least one closed single turn of superconducting material positioned in a plane adjacent and parallel to said one plane, and
(c) the closed turn in said one plane being separated from the closed turn in said adjacent plane by material that has good electrical conductivity.

12. A magnet structure comprising a plurality of separated closed single turns of superconducting material supported in the same plane, said turns being positioned in substantially concentric relation, said turns being electrically insulated from each other with no direct-current connection between them while they are in the superconducting state, there being no external electrical energizing connections to said turns.

13. A magnet structure comprising
(a) a plurality of closed single turns of superconducting material located in each of a plurality of adjacent parallel planes, the turns in each plane being separated from each other, and
(b) means separating the turns in one plane from those in the adjacent plane.

14. A magnet structure comprising
(a) a plurality of closed single turns of superconducting material positioned in one plane,
(b) said turns being positioned in substantially concentric relation,
(c) a plurality of closed single turns of superconducting material positioned in a plane adjacent and parallel to said one plane,
(d) said turns in said adjacent plane being positioned in substantially concentric relation, and
(e) the closed turns in said one plane being separated from the closed turns in said adjacent plane by material that has good heat conductivity.

References Cited by the Examiner

UNITED STATES PATENTS 2,926,326 2/1960 Boily et al.
3,005,117 10/1961 Buchhold.

FOREIGN PATENTS 1,197,710 6/1959 France.

OTHER REFERENCES

Kolm et al.: High Magnetic Fields, The M.I.T. Press and John Wiley & Sons Inc., N.Y., QC 760 16, pp. 592–596.

BERNARD A. GILHEANY, *Primary Examiner.*

ROBERT K. SCHAEFER, BENJAMIN DOBECK, *Examiners.*

G. HARRIS, JR., *Assistant Examiner.*